Jan. 22, 1963 H. J. CVETKO 3,075,054

STYLUS HOLDER FOR PHONOGRAPH PICKUP
CARTRIDGES AND THE LIKE
Filed March 31, 1959

INVENTOR

HENRY J. CVETKO

BY Francis J. Klempay

ATTORNEY

United States Patent Office 3,075,054
Patented Jan. 22, 1963

3,075,054

STYLUS HOLDER FOR PHONOGRAPH PICKUP CARTRIDGES AND THE LIKE

Henry J. Cvetko, Geneva, Ohio, assignor to The Astatic Corporation, Conneaut, Ohio, a corporation of Ohio
Filed Mar. 31, 1959, Ser. No. 803,148
9 Claims. (Cl. 179—100.41)

The present invention relates generally to the art of recording and reproducing sound and more particularly to the provision of an improved stylus holder for phonograph pickup cartridges and the like.

As will be understood by those skilled in this art, a phonograph pickup cartridge serves as a means for translating the intelligence recorded in the continuous groove of a record disc, for example, into electrical signals which may then be reproduced as audible sound. Such a phonograph pickup cartridge usually comprises a transducer mechanism, one or more record disc groove engaging tips, a stylus holder interconnecting the groove engaging tips and the transducer mechanism and suitable output terminal means. The phonograph pickup cartridge is adapted to be mounted in the outer free end of a phonograph tone arm so that the operatively disposed groove engaging tip thereof may accurately track the continuous groove of a record disc. The output terminal means are connected to ancillary amplifying apparatus and speakers whereby mechanical undulations of the groove engaging tip are reproduced as audible sound. The over-all performance of the phonograph pickup cartridge is determined by combination of factors including, among others, the resonance, the compliance, the damping, the mass and the transmissivity of the transducing system.

It is the prime or ultimate object of the present invention to provide a highly improved stylus holder for phonograph pickup cartridges and the like which is so constructed and arranged that all of the above mentioned factors effecting the over-all performance of a phonograph pickup cartridge are under the accurate control of the designing engineer.

Another object of the invention is to provide a stylus holder for phonograph pickup cartridges and the like which embodies means for introducing a high degree of mechanical compliance or flexibility into the transducing system closely adjacent the groove engaging tips. This is accomplished by the use of a compliant coupling member which, in addition to providing the desired degree of mechanical compliance or flexibility, exhibits mechanical damping properties to thereby provide a better frequency response and control over a selected frequency range for the phonograph pickup cartridge.

Yet another object of the invention is to provide a stylus holder for phonograph pickup cartridges and the like which includes means for adjusting the compliance of the transducing system. This object is accomplished by applying predetermined and preselected compressive forces to a normally compliant coupling member.

Still another object of the invention is the provision of a stylus holder for phonograph pickup cartridges and the like which is more effective and efficient over a wider frequency range than stylus holders constructed in accordance with the teachings of the prior art. The vibration transmitting stylus holder of the present invention comprises a combination of relatively rigid material with relatively soft dead elastomeric material which are combined in such a fashion that the harder material controls the lower frequencies while the softer material controls the higher frequencies. A stylus holder composed of such materials is much more effective over the entire selected frequency range than a stylus holder fabricated from a single material.

Yet a further object of the invention is the provision of stylus holder for phonograph pickup cartridges and the like which is so designed and constructed that the reactive mass immediately surrounding the groove engaging tips is substantially reduced. This greatly decreases directly radiated sound, commonly referred to as "needle talk" in the art.

A still further object of the invention is to provide a stylus holder for phonograph pickup cartridges and the like which is adapted to be operatively connected in an improved manner with the transducer mechanism. The arrangement is such that a minimum of mass is connected to the transducer mechanism and the stylus holder is securely mounted on the transducer mechanism.

Another important object of the invention is to provide a stylus holder for phonograph pickup cartridges and the like which provides an extremely safe environment of operation for both the transducer mechanism and the record groove engaging tips. Also, the combination of the relatively hard and soft materials mentioned above provides means for insuring reasonable stability under static conditions and a desired frequency selective behavior under dynamic conditions.

A further object of the invention is to provide a stylus holder for phonograph pickup cartridges and the which is characterized by its extreme ease and low cost of manufacture and assembly whereby the same is well adapted to serve the mass market.

The above, as well as other objects and advantages of the invention, will become more fully apparent upon consideration of the following specification and accompanying drawing wherein there is disclosed a preferred embodiment of the invention.

Figure 1:
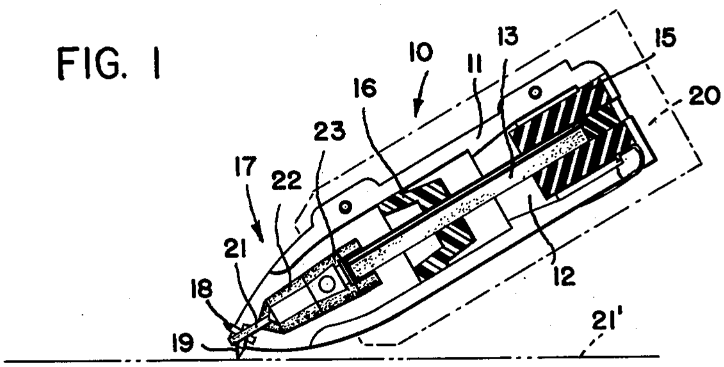
FIGURE 1 is a longitudinal sectional view showing a phonograph pickup cartridge in its operative position embodying a stylus holder constructed in accordance with the teachings of the present invention.

Referring now to the drawing, and initially to FIGURE 1 thereof, there is shown a phonograph pickup cartridge, generally designated by the reference numeral 10, which comprises a properly formed housing 11 having an internal cavity 12 therein. A transducer mechanism comprising a pair of angularly related piezoelectric transducer elements 13 and 14 are mounted and supported within the cavity 12 by a clamp bushing 15 and a bender bushing 16. Attached to the forward end of the transducer mechanism is a stylus holder, generally designated by the reference numeral 17, which carries a pair of divergently related record disc groove engaging tips 18 and 19.

The phonograph pickup cartridge 10 is adapted to be releasably received within a holder 20 indicated by the broken lines which is in turn adapted to be mounted in the outer free end of a phonograph tone arm, not shown. The tone arm supports the pickup cartridge 10 for swinging motion over the surface of a record disc 21' whereby the operatively positioned one of the groove engaging tips 18 or 19 is adapted to accurately track the continuous groove of the record disc. The pickup cartridge 10 and the holder 20 are journaled in the tone arm whereby the same may be turned over to bring either of the groove engaging tips 18 or 19 into operative playing relation with respect to the groove in the record disc 21'. The groove engaging tips 18 and 19 are selected to suit the various kinds of record discs to be played—different speeds, monoaural or stereophonic, for example.

The phonograph pickup cartridge 10 is ideally adapted for the playing of stereophonic or binaural record discs and, with the exception of the stylus holder 17, is disclosed and claimed in the co-pending application of Henry J. Cvetko and Maurice M. Palo, Serial No. 782,571, filed December 23, 1958, entitled "Sterephonic Phonograph Pickup Cartridge" which is assigned to the assignee of the present invention. Reference is made to this co-pending application for those desiring a more detailed description of the construction and operation of the phonograph pickup cartridge.

It should be understood, however, that the stylus holder of the present invention is not limited to employment with the phonograph pickup cartridge shown but has equal utility in a monaural pickup cartridge of the type disclosed in the co-pending application of Paul Vincent Kelly and Edward R. McKee, Serial No. 710,355, filed January 21, 1958, entitled "Pick-Up Cartridge and Stylus Supporting Nosepiece Therefor" which is assigned to the assignee of the present invention, for example, now Patent No. 2,983,518. It will be further understood that the teachings of the present invention have equal utility in all types and designs of phonograph pickup cartridges, such as, for example, piezoelectric, magnetic, dynamic or variable capacitance types.

Figure 2:
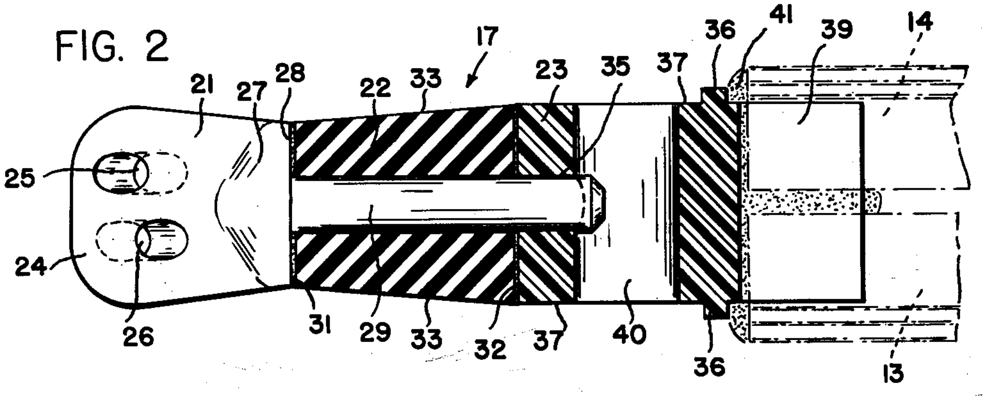
FIGURE 2 is a plan view, partially in section, of the stylus holder employed in the assembly shown in FIGURE 1.
Figure 3:
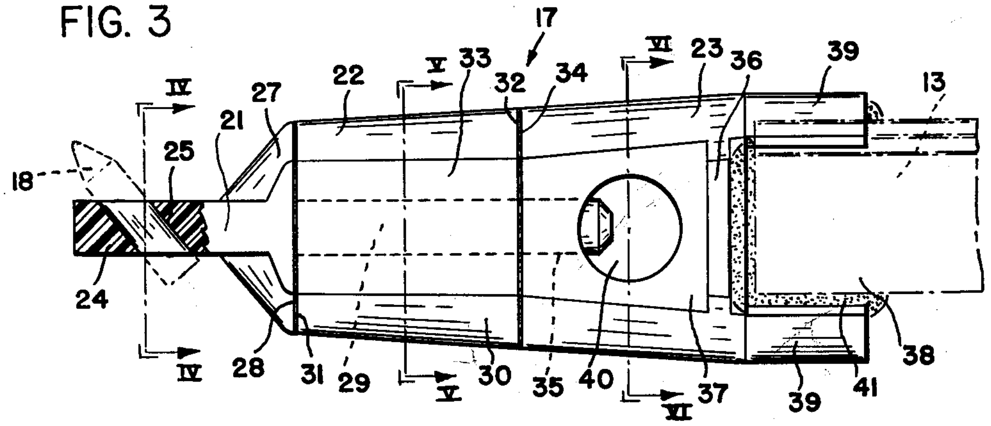
FIGURE 3 is a side elevational view of a stylus holder depicted in FIGURE 2.
Figure 4:
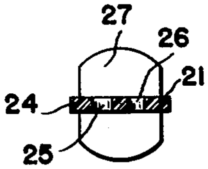
FIGURES 4, 5 and 6 are end sectional views taken along the section lines IV—IV, V—V and VI—VI, respectively, of FIGURE 3.
Figure 5:
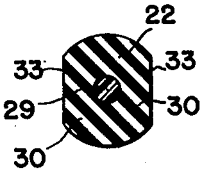
Figure 6:
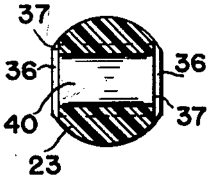

Considering now the construction of the stylus holder 17 and referring particularly to FIGURES 2 and 3 of the drawing, the stylus holder comprises a forwardly disposed groove engaging tip support 21, a coupling member 22 and a rearwardly disposed transducer fitting 23. It will be observed at the groove engaging tip support 21, the coupling member 22 and the transducer fitting 23 are disposed in longitudinally and axially aligned relation to define the stylus support.

The groove engaging tip support 21 is molded or otherwise formed from a relatively rigid material, such as vinyl, nylon or styrene, for example, and exhibits a desired degree of resiliency. The forward end 24 of the support 21 is formed in a generally flat plate-like shape and has a relatively small thickness dimension as shown in FIGURE 3 while having relatively large width dimension as shown in FIGURE 2. Divergently related and transversely spaced angled through bores are provided in the plate-like forward end 24 of support 21 to accommodate the pair of groove engaging tips 18 and 19. The bores 25 and 26 extend entirely through the thickness of the thin plate-like forward end 24 and are spaced closely adjacent the longitudinal center line of the stylus holder. Directly to the rear of the through bores 25 and 26 the thickness dimension of the support 21 is enlarged to form the generally elliptical forwardly tapering enlargement 27 which has its major axis disposed vertically and normally with respect to the plane of the plate-like forward end 24. The enlargement 27 is provided to increase the rigidity of the support 21 and it will be noted that the thin thickness dimension of the forward end 24 allows this portion of the support to be flexed in a vertical direction, depending, of course, upon the inherent resiliency of a material forming the same, while the large width dimension of the forward end prohibits flexing or bending in the transverse or lateral direction. The elliptical enlargement 27 terminates in a generally flat vertically disposed and elliptically shaped rear surface 28. Extending rearwardly from this surface is an elongated cylindrical pin 29. The cylindrical pin 29 is a portion of the support 21 and is molded, or otherwise formed, integrally with the plate-like forward end 24 and the elliptical enlargement 27.

Disposed in encircling relation about the longitudinally extending cylindrical pin 29 is the coupling member 22 which, in essence, comprises an annular sleeve 30 formed from a soft rubber or other suitable elastomer. The forward end surface 31 of the coupling member 22 conforms substantially to the rear surface 28 of the elliptical enlargement 27 of the support 21 and the coupling member generally increases in cross sectional area toward the vertically disposed and elliptically shaped rear end surface 32 thereof. The annular sleeve 30 defining the coupling member 22 is generally elliptical in cross sectional shape throughout its length and defines a pair of flat side surfaces 33. It will be noted that the coupling member 22 is received entirely on the cylindrical pin 29 and that the cylindrical pin projects rearwardly beyond the rear end surface 32 of the coupling member.

Mounted concentrically on the projecting rear end of the cylindrical pin 29 is the transducer fitting 23. The transducer fitting 23 is formed from a plastic material similar to or the same as that used in forming the groove engaging tip support 21. The forward end surface 34 of the transducer fitting conforms substantially to the cross sectional shape of the rear end surface 32 of the coupling member 22 and an axial bore 35 is provided for receiving the projecting end of the cylindrical pin 29. The generally increasing size and elliptical shape exhibited in the coupling member 22 continues from the forward end surface 34 of the transducer fitting 23 to a point where a pair of oppositely directed flanges 36 extend outwardly from the flat side surfaces 37 of this fitting. The extreme rear end of the transducer fitting 23 is generally cylindrical in cross sectional shape and has a transversely extending rectangular slot 38 therein to define a pair of rearwardly extending and vertically spaced projections 39. Disposed in parallel relation with respect to the slot 38 and extending transversely between the flat side surfaces 37 of a transducer fitting 23 is a large through bore 40. The through bore 40 affords a convenient means for aligning and securing the transducer fitting 23 to the transducer elements 13 and 14 and, in addition, substantially reduces the mass of an entire stylus holder.

In assembly of the stylus holder above described, the projections 39 of the transducer fitting 23 are positioned loosely over the free forward ends of the transducer elements 13 and 14 in properly aligned relation with respect thereto by employing suitable aligning means, not shown, extending into the through bore 40. The forward ends of the transducer elements 13 and 14 are rigidly secured within the slot 38 by means of a mass of hard cement 41. It is the function of the pair of flanges 36 to confine the mass of cement 41 and to prevent this cement, when in its liquid state, from flowing forwardly over the flat side surfaces 37 and 33. It will thus be seen that when the mass of cement 41 hardens that the transducer fitting 23 will be very rigidly secured to the forward ends of the transducer elements 13 and 14.

With the transducer fitting 23 aligned in a true transverse plane by the above mentioned aligning means, the groove engaging tip support 21, with the coupling member 22 positioned on the cylindrical pin 29 and with proper cement applied to the forward and rear end faces 31 and 32 of the coupling member, is brought into position with the end of cylindrical pin 29 being inserted into the axial bore 35 of the transducer fitting 23. A second aligning means, also not shown, properly positions the flat side surfaces of the support 21 and coupling member 22 in normally disposed relation with respect to the axis of the transversely extending through bore 40.

A controlled amount of end pressure is applied to the forward end 24 of the groove engaging tip support 21 to compress the annular sleeve 30 and to bring the same under a definite predetermined loading. The coupling member 22 is retained under a predetermined compressive loading due to the tight frictional fit between the axial bore 35 in the transducer fitting and the projecting end portion of the cylindrical pin 29. This permits accurate adjustment of the operating characteristics of the stylus holder of the present invention as will be hereinafter more fully described.

The engineer designing a stylus holder constructed in accordance with the present invention is provided with wide latitude in determining the transmitting and attenuating characteristics of a resultant phonograph pickup cartridge through the use of the present stylus holder wherein various selected materials may be combined. For example, the groove engaging tip support 21 and the transducer fitting 23 may be formed from any of a wide variety of materials which exhibit desired degrees of hardness and/or resiliency and which are best adapted for the intended use. The coupling member 22 may be formed from any of the natural or synthetic rubber hydrocarbons or from any suitable plastic elastomer. The coupling member 22 will generally be much more compliant than the support 21 and the transducer fixture 23. Of course, the length of the coupling member 22 may be designed as is best adapted for the intended use of the phonograph pickup cartridge.

The use of a stylus holder comprising a plurality of component parts fabricated from different materials allows the same to operate with increased efficiency over a wider frequency range that has heretofore been possible. The relatively rigid material of the cylindrical pin 29 transmits lower frequencies very efficiently and is simultaneously damped by the elastic material of coupling member 22. At higher frequency the initially relatively soft and dead coupling member 22 behaves in a manner to transmit more energy and hence greatly broadens the effective frequency range of the phonograph pickup cartridge.

It will be noted that the cylindrical pin 29 surrounded by the coupling member 22 is disposed closely adjacent to the groove engaging tips 18 and 19 and this is most effective in improving the ability of the groove engaging tips to track the grooves of record discs. The damping character of coupling member 22 absorbs any unwanted frequencies of vibration whereby the same are not transmitted to the transducer elements 13 and 14. The stylus holder of the present invention allows the compliance and damping to be introduced at a point closely adjacent the groove engaging tips rather than in the mounting of the transducer elements as is the case in prior art devices.

Of particular importance is the fact that the coupling member 22 can be subjected to a desired and preselected degree of compression whereby a stylus holder may be designed and manufactured which is best adapted for its intended use. The stylus holder of the present invention is so designed that the mass thereof is kept to an absolute minimum. However, means are provided for very securely attaching the stylus holder to the free ends of the transducer elements.

Another important aspect of the present invention is that the elliptical shape of the coupling member 22 is such that the stylus holder has more strength in the vertical direction than in the lateral direction. This enables the stylus holder to better withstand the vertical forces to which it is normally subjected by the controlled weight of the tone arm assembly. However, the stylus holder retains an over-all degree of flexibility to permit the groove engaging tips 18 and 19 to retract under accidental and excessive forces.

It should thus be apparent that the objects initially set forth have been accomplished. Although there has been shown and described a preferred illustrated embodiment constructed in accordance with the teachings of the invention, it should be understood that many changes may be made therein without departing from the invention. Accordingly, reference should be had to the following appended claims in determining the true scope and intent of the invention.

I claim.

1. A stylus support for a phonograph pickup cartridge comprising a tip support of relatively rigid material, a transducer fitting of relatively rigid material, a reduced section of relatively rigid material interconnecting and extending between said tip support and said transducer fitting, a coupling member of relatively soft elastomeric material surrounding said reduced section and completing the connection between said tip support and said transducer fitting, and said reduced section maintaining said tip support, said coupling member and said transducer fitting in assembled relation.

2. Apparatus according to claim 1 further characterized in that said reduced section comprises a generally elongated cylindrical pin, and said coupling member comprising an annular sleeve received on said cylindrical pin.

3. Apparatus according to claim 2 further characterized in that said cylindrical pin is an integral portion of said tip support, a bore in said transducer fitting, the projecting end portion of said cylindrical pin being tightly received within said bore, said tip support and said transducer fitting having opposed adjacent end faces, and said annular sleeve being compressed under preselected compressive loading between said opposed adjacent end faces.

4. A stylus support for a phonograph pickup cartridge comprising a tip support of relatively rigid material, a transducer fitting of relatively rigid material, a coupling member of relatively soft elastomeric material disposed between said tip support and said transducer fitting, and means to clamp said coupling member between said transducer fitting and said tip support whereby said coupling member is subjected to a predetermined compressive loading, said means to clamp comprising a reduced section of relatively rigid material extending between and interconnecting said tip support and said transducer fitting.

5. A driving connection between the groove engaging tip and the transducer mechanism of a phonograph pickup assembly which comprises a small sectional area of relatively rigid material, a relatively large sectional area of soft elastomeric material, and said small sectional area and said large sectional area being arranged in parallel mechanical relation throughout the entire length of said relatively large sectional area of soft elastomeric material between said groove engaging tip and said transducer mechanism.

6. Apparatus according to claim 5 further comprising means to clamp said large sectional area whereby said soft elastomeric material may be subjected to a preselected degree of compressive loading.

7. A stylus support for a phonograph pickup cartridge for coupling a groove engaging tip with a transducer mechanism, said stylus support comprising a tip support and a transducer fitting, said transducer fitting having a transversely extending slot adjacent the rear end thereof to define a pair of vertically spaced and rearwardly extending projections, said transducer mechanism comprising a pair of transversely spaced elongated transducer elements, a hardened mass of cement firmly securing said stylus support to said transducer elements with the forward ends of the same disposed between said vertically spaced projections, a pair of flanges projecting transversely outwardly from opposite sides of said transducer fitting adjacent said slot, and said pair of flanges confining said mass of cement to said slot when said mass of cement is in its liquid state during assembly.

8. A stylus support for a phonograph pickup cartridge for coupling a groove engaging tip with a longitudinally extending transducer mechanism, said stylus support comprising a tip support portion and a transducer fitting portion, said stylus support being mounted on and carried by said transducer mechanism, said stylus support being longitudinally aligned with respect to said longitudinally extending transducer mechanism, said tip support portion being formed from a relatively rigid material, said tip support portion having a longitudinally extending plate-like forward end of relatively thin vertical thickness dimension, an angled and vertically inclined through bore in said plate-like forward end for receiving a groove engaging tip, said transducer mechanism being driven in response to side-by-side movements of said groove engaging tip, and said stylus support further comprising a generally elliptical enlargement of increasing vertical thickness dimension disposed directly to the rear of said plate-like forward end and between said tip support portion and said transducer fitting portion.

9. A stylus support for a phonograph pickup cartridge for coupling a groove engaging tip with a longitudinally extending transducer element, said transducer element having the forward end thereof free, said stylus support being mounted on and carried by said forward end of said transducer element, said stylus support being longitudinally aligned with respect to said longitudinally extending transducer element, said stylus support comprising a tip support portion and a transducer fitting portion, said transducer support portion having a transversely extending and rearwardly opening slot adjacent the rear end thereof, said slot defining a pair of vertically spaced projections, said forward end of said transducer element being received within said slot between said vertically spaced projections, a mass of cement filling said transversely extending slot to maintain said stylus support and said transducer element in operative assembled relation, a pair of transversely extending flanges projecting outwardly from opposite sides of said transducer fitting portion adjacent said slot, and said pair of flanges confining said mass of cement to said slot when said mass of cement is in its liquid state during assembly.

References Cited in the file of this patent

UNITED STATES PATENTS

| | | |
|---|---|---|
| 2,492,446 | Schumann | Dec. 27, 1949 |
| 2,955,216 | Dieter | Oct. 4, 1960 |